(No Model.)
H. H. HEEB & J. F. SCHONERT.
TWO WHEELED VEHICLE.
No. 292,913. Patented Feb. 5, 1884.
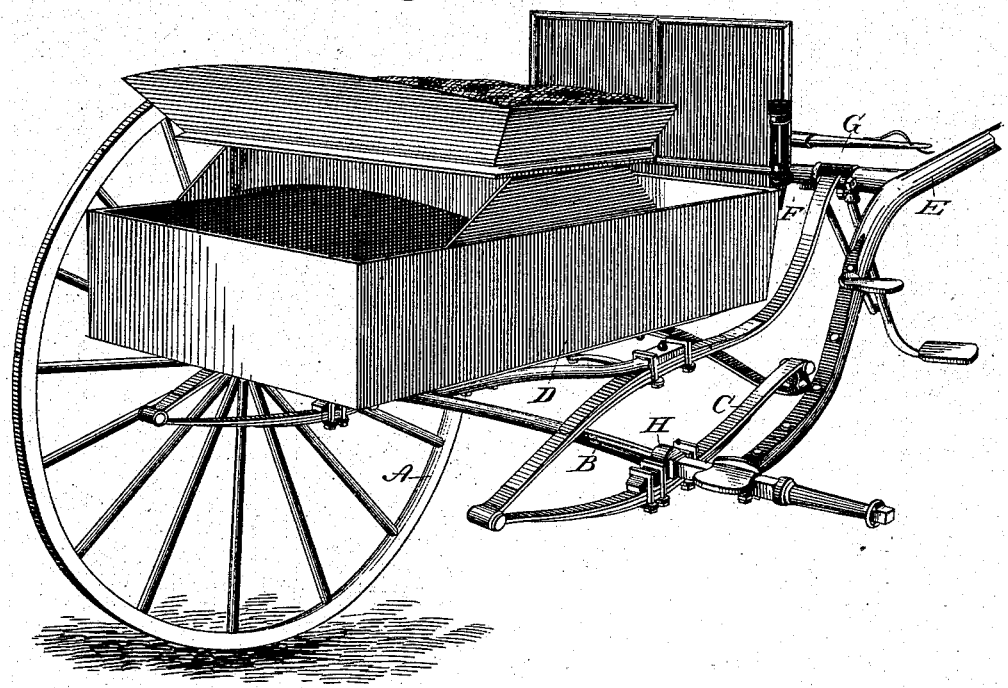
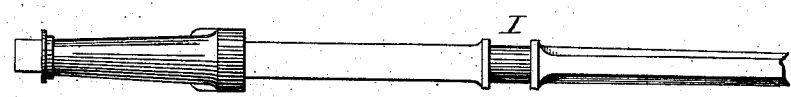
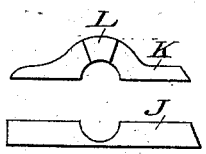
Witnesses:
J. J. Nixon
F. H. Gilbert
Inventors
Henry H. Heeb and
John F. Schonert
By W. W. Boyd
A. Borney.

UNITED STATES PATENT OFFICE.

HENRY H. HEEB AND JOHN F. SCHONERT, OF FAYETTEVILLE, INDIANA.

TWO-WHEELED VEHICLE.

SPECIFICATION forming part of Letters Patent No. 292,913, dated February 5, 1884.

Application filed October 10, 1883. (No model.)

*To all whom it may concern:*

Be it known that we, HENRY H. HEEB and JOHN F. SCHONERT, citizens of the United States, residing at Fayetteville, in the county of Fayette and State of Indiana, have invented a new and useful Improvement in Two-Wheeled Vehicles, of which the following is a full, clear, and exact description.

Our invention relates to improvements in two-wheeled vehicles; and the object of the invention is to construct a two-wheeled vehicle with a set of regular platform-springs in such a manner that the springs may freely adjust themselves to the body which they support, giving, at all times and under changeable circumstances, to the said body the full benefit of all there is in a free and easy riding self-adjusting set of platform-springs, at the same time admitting, to a desired degree, of a vibratory movement of both body and springs, independent of a rigidly-connected axle and shafts, said axle and shafts being free to take the up-and-down motion caused by the traveling horse without communicating the same to the body, said springs having jointed connections with the shafts as well as journal-connections with the axle.

To have a proper understanding of the invention, reference will be had to the accompanying drawings, forming part of this specification, in which—

Figure 1 is a perspective view of a two-wheeled vehicle constructed with our improved spring-connections, and Fig. 2 a detached view of the axle and journal for the spring-connection.

In constructing the vehicle, we use ordinary carriage-wheels, A, an ordinary vehicle-axle, B, on which journals are turned at the points where springs connect.

C represents the platform-springs which support the body, and which connect to axle and to cross-bar of shafts.

D represents the body, which may be of any desired form.

E represents the shafts, which are rigidly connected to the axle.

F represents the cross-bar of shafts.

G represents the connection of the forward extended end of springs to the cross-bar of shafts.

H represents the point of connecting the springs to the axle.

I represents one end of the journaled axle.

J represents the under half of journal-box used in connecting the springs to axle.

K represents the upper half of the journal-box, upon the top edges of which are flanged projections.

L represents the projection on the edge of the upper half of the journal-box. The object of this projecting flange is to act as a stop, preventing the box from turning far, either backward or forward, by the projection coming in contact with the square part of the axle.

We are aware that heretofore common elliptic springs have been adjusted to a vehicle-axle by means of a complicated device claiming a combination of parts as essentials, such as rubber blocks, wooden blocks, T-plates, a weakened journal-box, &c. We therefore lay no claim to such construction, considering it as unnecessarily expensive, and, in fact, as inoperative, so far as our construction of vehicle is concerned. In our invention we dispense with rubber blocks, wooden blocks, T-plates, the ill-constructed journal-box, and several extra clips and bolts, and employ in their stead plain, simple, and cheap journal-boxes, on the upper edges of which are beveled projections, so arranged as to stop the journal-boxes from turning too far either way.

Having thus fully described our invention, what we claim as new, and desire to secure by Letters Patent, is—

1. In a two-wheeled vehicle having its body supported by a set of regular platform-springs, the combination of the jointed connections of springs to cross-bar of shafts, with the journal-connections to the axle, and with the journal-boxes, the upper half of which are constructed with beveled projections, all as described and shown.

2. In a two-wheeled vehicle, the combination of a journaled axle with a journal-box having a flanged projection, substantially as described, and for the purpose specified.

HENRY H. HEEB.
JOHN F. SCHONERT.

Witnesses:
AUGUSTUS WERSHY,
JOHN RYAN.